A. H. NORTH.
MACHINES FOR STRIPPING CUTLERY STEELS.
No. 175,142. Patented March 21, 1876.
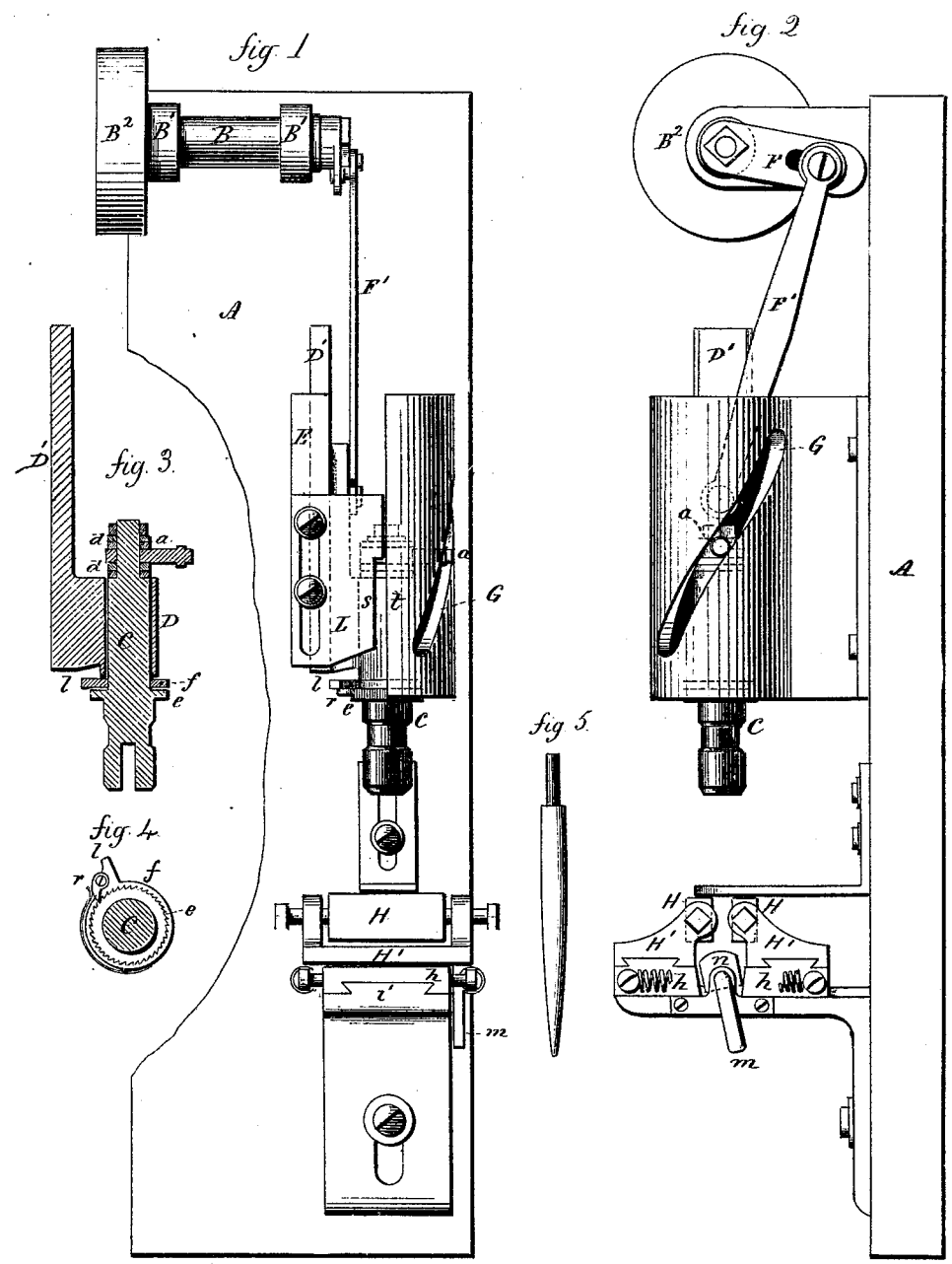

UNITED STATES PATENT OFFICE.

ALBERT H. NORTH, OF NEW BRITAIN, CONNECTICUT, ASSIGNOR TO LANDERS, FRARY & CLARK, OF SAME PLACE.

IMPROVEMENT IN MACHINES FOR STRIPPING CUTLERY-STEELS.

Specification forming part of Letters Patent No. 175,142, dated March 21, 1876; application filed February 8, 1876.

*To all whom it may concern:*

Be it known that I, ALBERT H. NORTH, of New Britain, in the county of Hartford and State of Connecticut, have invented a new Machine for Stripping Cutlery-Steels; and I do hereby declare the following, when taken in connection with the accompanying drawings and the letters of reference marked thereon, to be a full, clear, and exact description of the same, and which said drawings constitute part of this specification, and represent, in—

Figure 1, front view; Fig. 2, side view; Figs. 3 and 4, detached views; Fig. 5, the blank.

This invention relates to a device for "stripping" cutlery-steels—that is to say, roughening the surface of the steel. The usual method for doing this work, and which has produced the best result, has been to hold a file at right angles to the steel, and draw it longitudinally—that is, from heel to point—over the surface of the steel, so as to form longitudinal cuts. This is a slow and laborious process, and requires very skillful labor, and consequently makes good steels expensive. The object of this invention is to automatically perform the same operation, and thereby greatly reduce the expense of manufacture; and the invention consists, principally, in the arrangement of a mandrel to carry the steel, and having a combined reciprocating and rotative movement, combined with a pair of self-adjusting file-surfaced plates, through which the said movement of the mandrel forces the steel blank, as hereinafter described.

A is the base of a machine, preferably arranged in a vertical position; B, the driving-shaft, supported in bearings $B^1$, and which is caused to revolve by the application of power thereto, through the pulley $B^2$ or otherwise. C is a mandrel, arranged in a bearing, D, on a carriage, D', and so as to rotate freely therein. The said carriage is supported in a suitable guide, E, so that the carriage will move in a line parallel to the axis of the mandrel C. To this carriage a reciprocating movement is imparted through a crank, F, connected to the carriage by a pitman, F', so that each revolution of the crank imparts a longitudinal reciprocating movement to the mandrel. Around this mandrel an arm, $a$, is placed, with frictional springs $d$, or other device which, while allowing the mandrel to be turned independently of the arm $a$, will yet so hold the arm and mandrel that they may turn together. This arm $a$ extends into a stationary spiral groove, G; hence, as the mandrel is reciprocated, the arm $a$ will follow that spiral groove, and consequently rotate the mandrel to that extent. The lower end of the mandrel is fitted to receive and hold the blank by the tang. In line with the axis of the mandrel, and below it, is arranged a pair of plates, H H, each hung in an independent carriage, H', and these carriages arranged on auxiliary carriages $h$, the auxiliary carriages moving on guides $i$ in one direction, while the carriage H' may be moved on the auxiliary carriage $h$ at right angles thereto. These two carriages are forced toward each other by a suitable spring or weight; but between them there is arranged a cam, $n$, with a handle, $m$, by which the two may be forced and held asunder when occasion requires. One or both of the plates H upon their opposite faces are cut like a file, and these are hung at their ends, so as to permit an oscillating adjustment. The steel being placed in the mandrel, its point enters between the plates H, and as the mandrel is reciprocated the blank is forced back and forth between the plates H, stripping the surface of the steel in like manner as by hand, the spiral groove G giving to that stripping a spiral turn.

To automatically rotate the blank so that it may be stripped entirely around its surface, a ratchet or toothed wheel, $e$, is arranged on, or made a part of, the mandrel C, and loosely around the shaft is a collar, $f$, from which projects an arm, $l$; on this is a pawl, $r$. These reciprocate with the mandrel. An adjustable guide, L, is arranged adjoining a corresponding vertical guide, $t$, and so as to form a vertical slot, $s$, of such width that the arm $l$ on the ratchet-collar will pass freely therein.

Starting from the highest point, the mandrel is rotated by the arm $a$ passing down through the spiral slot G, but the slot $s$ prevents the collar $f$ from turning; hence the ratchet will be turned one or more teeth, independent of the collar, according to the position of the guide L, but in the descent, so soon as the arm *l* passes out the slot, then the collar *f* and arm *l* will rotate with the mandrel.

When the mandrel rises the collar *f* will turn with it until the arm *l* strikes the side *t* of the slot; then it will hold the mandrel and prevent its further rotation, and during the remainder of the ascent the arm *a* will follow the spiral slot G and turn independent of the mandrel; again descending, the mandrel will be turned, while the collar *f* stands as before, and the ratchet will take one or more teeth, as before described. Hence, at each full reciprocation, a partial rotation of the mandrel is made and held, and so that, continuing such reciprocation, the mandrel will make a full revolution, each descent stripping the steel at a new point, until the whole surface is properly and regularly stripped.

The adjustment of the guide L up or down will cause a corresponding less or greater number of teeth of the ratchet to be taken by the pawl at each reciprocation.

The adjustment of the cutting-plates H to the right or left is made so that the whole length of the surface may be brought into work.

A single cutting-plate will answer the purpose, with a suitable guard to hold the steel against the plate; but two plates are preferable.

The machine is adjustable by the length of crank, elevation of the cutting-plates, &c., so that steels of different lengths may be stripped with equal facility.

I claim—

1. The combination of the mandrel C, having a combined reciprocating and rotary motion imparted thereto, and constructed to receive and hold the steel blank, with the cutting-plates H, one or more, substantially as described.

2. The combination of the reciprocating, rotative, steel-holding mandrel, the pawl and ratchet in connection therewith, the vertical slot for governing the operation of the pawl upon the ratchet, substantially as described.

3. The combination of the reciprocating, rotative, steel-holding mandrel, the spiral slot G, and the frictional arm *a* on the mandrel, with the cutting-plates H, one or more, substantially as described.

4. The combination of the reciprocating, rotative, steel-holding mandrel, the frictional arm *a* thereon, the spiral slot G, the ratchet and pawl in connection with said mandrel, and the vertical slot *s*, substantially as described.

5. The combination of the reciprocating, rotative, steel-holding mandrel with the cutting-plates H, one or more, made self-adjusting to the surface of the steel blank, substantially as described.

6. The combination of the reciprocating, rotative, steel-holding mandrel with the cutting-plates H, one or more, made self-adjusting to the surface of the steel blank, with the cam *n*, for opening the said plates, substantially as described.

ALBERT H. NORTH.

Witnesses:
J. C. ATWOOD,
GEO. D. COPLEY.